A. NOVY.
TIRE ARMOR.
APPLICATION FILED MAY 28, 1918.
1,305,400. Patented June 3, 1919.
2 SHEETS—SHEET 1.
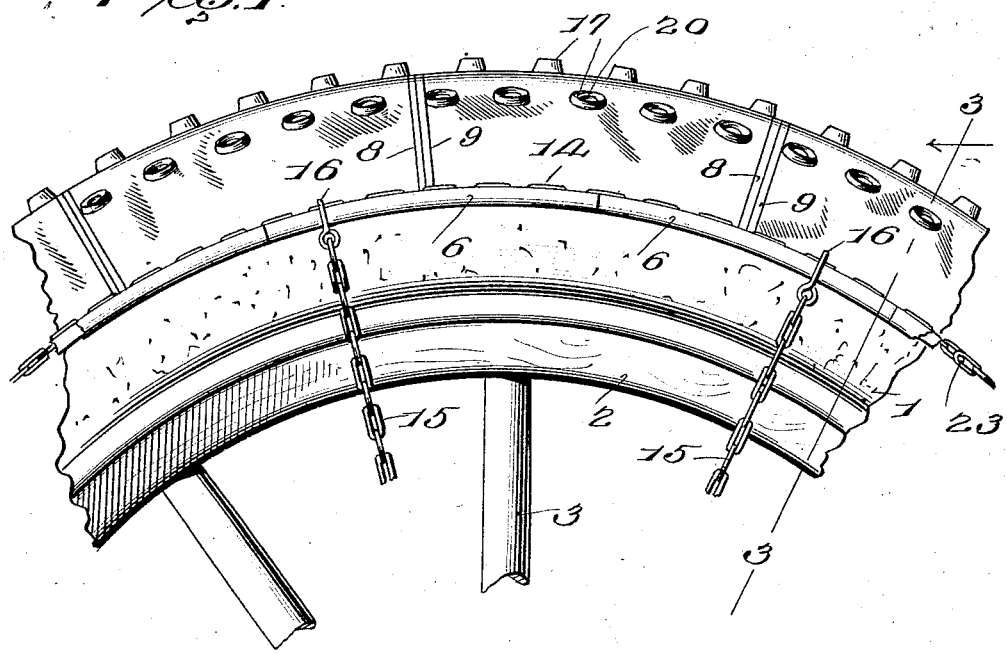
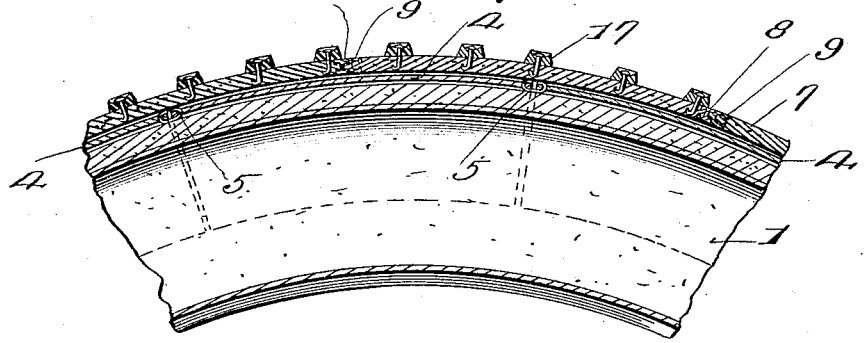
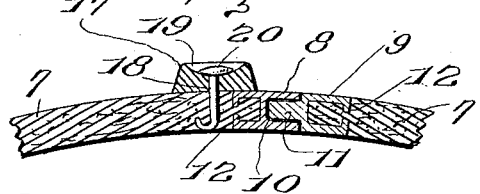
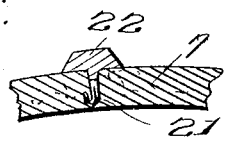
Inventor
Anthony Novy
By Lacey & Lacey
Attorneys

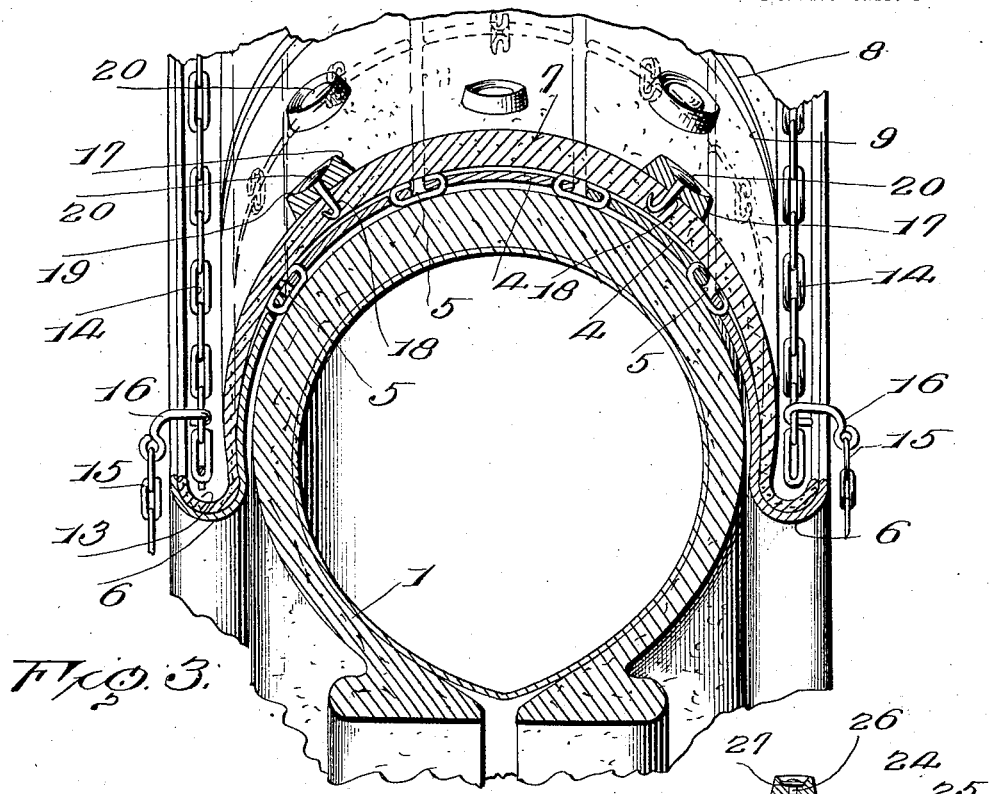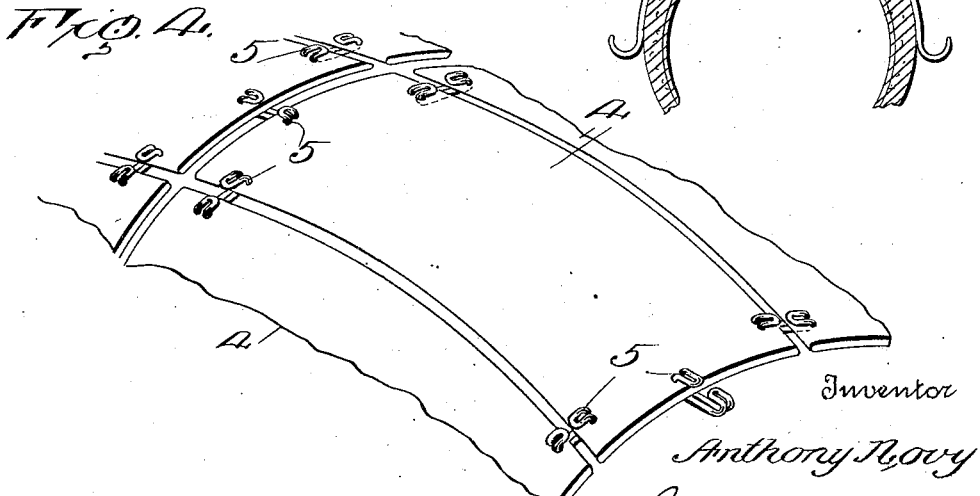

UNITED STATES PATENT OFFICE.

ANTHONY NOVY, OF RAPID CITY, SOUTH DAKOTA.

TIRE-ARMOR.

1,305,400.     Specification of Letters Patent.     Patented June 3, 1919.

Application filed May 28, 1918. Serial No. 236,972.

*To all whom it may concern:*

Be it known that I, ANTHONY NOVY, a citizen of the United States, residing at Rapid City, in the county of Pennington and State of South Dakota, have invented certain new and useful Improvements in Tire-Armors, of which the following is a specification.

This invention relates to tire armor and has for its object the provision of an inexpensive device which may be readily applied to any standard pneumatic tire and protect the same against puncture without detracting from the easy riding qualities of the vehicle equipped with the tire. A further object of the invention is to provide a tire armor which will not be easily displaced when in use and which will be so constructed that repairs or the renewing of parts may be very easily accomplished.

These stated objects and such other objects as will incidentally appear in the course of the following description are attained in such a device as is illustrated in the accompanying drawings, and the invention resides in certain novel features which will be particularly pointed out in the claims following the description.

In the drawings:

Figure 1 is a side view of a portion of a wheel and tire having my improved armor applied thereto;

Fig. 2 is a longitudinal section of the tire and the armor thereon;

Fig. 3 is a transverse section on the line 3—3 of Fig. 1;

Fig. 4 is a detail perspective view of the base member of the armor;

Fig. 5 is a detailed enlarged longitudinal section of a portion of the tread member of the armor:

Fig. 6 is a detail view showing a slightly different form of ground-engaging lug or stud.

Fig. 7 is a transverse section showing a slight modification.

The pneumatic tire indicated at 1 may be of any well-known type and the felly 2 and spokes 3 of the wheel may likewise be of any desired construction, these elements forming no part of my invention and being illustrated only in order that the use of the tire armor may be more readily comprehended.

In carrying out my invention, I provide a base member consisting of a plurality of metal plates 4 which are disposed in transverse and longitudinal series around the tread portion of the tire, the longitudinal dimension of the plates being greater than the transverse dimension of the same and adjacent plates being connected at their ends and at their side edges by links 5 which are inserted in suitable openings formed through the plates and have their ends formed into overhanging hooks so that the plates will be retained in their proper relative positions, but will be permitted to move to a limited extent independently of each other whereby they may yield to any inequalities in the surface of the road. The plates will be preferably of an arcuate form both longitudinally and transversely so that they will fit closely to the tire without pinching the same and thereby creating excessive wear on the tire. As shown in the drawings, the base consists of five longitudinal rows of plates 4 and the plates in the side rows, by which term is meant those plates which are at the sides of the tire and closest to the rim or felly, are provided along their outer longitudinal edges with grooved extensions or flanges 6, the purpose of which will presently appear. The base member of the armor is covered by a tread member 7 of rubber, fiber, leather, or other flexible material and this tread member is divided transversely so that it consists of a plurality or series of sections extending circumferentially of the tire and the base member of the armor. The end edges of the sections of the tread member are reinforced by metal plates 8 and 9 which are arched so as to extend transversely over the tire, the member 8 being constructed with a groove 10 which is engaged by a tongue 11 on the member 9. The tongue and groove should be of such relative dimensions that a slight play will be permitted between the members so that the tire may possess all the desired flexibility, while the several sections of the tread member will be held closely together and present a continuous external surface. The outer surfaces of the reinforcing and wear members 8 and 9 are flush with the surfaces of the respective tread sections and the inner edges of the said reinforcing and wear plates are provided with teeth or spurs 12 whereby they may be clenched in the tread sections. This construction is clearly shown in Fig. 5. The side edges of the tread member sections are formed into grooved extensions or hooks 13 which seat in the grooved extensions or flanges 6 of the base member and retaining chains or cables 14 are engaged in and extend longitudinally around the entire circumference of the said extensions 13. These flexible retainers may have their ends 23 united in any convenient or preferred manner whereby the desired tension may be placed upon the chain to firmly retain the tread sections upon the base member. The holding force of the flexible retainers will, of course, be aided by the inflation of the tire and will coöperate with the internal pressure upon the tire to prevent displacement of the armor when the wheel is in use. To further aid in preventing displacement of the armor, holding chains 15 may be engaged in the retaining chains 14 and carried radially inward to be attached to the hub of the wheel or to the spokes of the same. These holding chains 15 may, of course, be connected with the retaining members in any desired manner and I have shown bent hook eyes 16 having their eyes engaged in the end links of the chains 15 and their hooks engaged in links of the chains 14. This construction will hold the chains 15 in the proper relation to the chains 14 without causing excessive strain or wear upon the longitudinal side seat 13 of the tread section or the flange 6 of the base member of the armor.

In order that the armor may firmly grip the surface of the road, especially when the road is of sandy or loose material, I provide buttons or lugs 17 which may be of rubber, fiber or other material and in the preferred form will be secured upon the tread member of the armor by clencher tacks or rivets 18 inserted through the button or lug and the tread member 7 and having its end or point doubled on itself through its contact with the metallic base member of the armor whereby it will be clenched in the tread member, as clearly shown in Fig. 5. The outer surface of the button or lug will preferably be dished, as indicated at 19, to accommodate the head 20 of the rivet so that the said head will not project beyond the button and be worn off to permit loss of the button. By employing buttons of rubber or fiber or other elastic material I obtain the desired grip upon the surface of the road without detracting from the flexibility of the armor or the tire but it may sometimes be preferred to have a button of metal or similar material and in this event the button may be formed integral with the clencher nail or rivet and constitute the head of the same, such construction being shown in Fig. 6, in which 21 designates the clencher nail or rivet and 22 the enlarged metallic head of the same which constitutes the ground-engaging lug or spur.

In Fig. 7 I have shown a modification of the armor which is especially adapted for exceedingly rough roads. In this form of the invention, the tread member is omitted and the buttons or studs 24 are secured upon the sectional metallic tire-engaging member 25. The buttons or studs are of rubber or fiber and are held by rivets 26 which are inserted outwardly through the member 25 and the respective buttons, the ends of the rivets being upset against washers 27 disposed in the cup-like outer faces of the buttons.

From the foregoing description, taken in connection with the accompanying drawings, it will be readily seen that I have provided a tire armor which may be readily applied to any standard tire and which will thoroughly protect the same against puncture without lessening the flexibility of the same. The armor is formed in sections which may be easily assembled by an unskilled workman so that if any one section should be worn out or so damaged as to need repairs a new section may be substituted therefor without requiring the provision of an entire new armor or consuming a great period of time. The armor will be found durable under use and may be manufactured and applied at a low cost.

Having described my invention, what is claimed as new is:

1. A tire armor comprising a base member having longitudinally grooved flanges at its side edges, a tread member having longitudinally grooved seats at its side edges fitting in the grooved flanges of the base member, and flexible retaining devices fitted in said seats.

2. A tire armor comprising a base member composed of independent plates flexibly connected at their adjacent ends and sides, the side plates being provided at their outer side edges with longitudinally grooved flanges, a tread member covering the base member and having longitudinally grooved extensions fitting in said grooved flanges of the base member, and flexible retaining members seated in said extensions to retain the members together and upon a wheel.

3. A tire armor comprising a base member composed of a plurality of plates flexibly connected at their sides and ends, a flexible tread member covering said plates, and means for retaining the tread member and the base member upon a tire.

4. A tire armor comprising a flexible cover constructed in sections, means for retaining said cover upon a tire, and wear plates secured respectively upon the adjacent transverse edges of the sections and having a hinged engagement, the outer surfaces of the plates being flush with the surfaces of the sections to which they are respectively secured.

5. A tire armor comprising a cover consisting of sections, means for retaining the cover upon the tire, and wear plates secured to the transverse edges of adjacent sections, the outer surfaces of the plates being flush with the outer surfaces of the sections to which they are respectively secured and the opposed edges of abutting plates being constructed one with a groove and the other with a tongue engaging the groove and having play therein.

In testimony whereof I affix my signature.

ANTHONY NOVY. [L. S.]